United States Patent [19]

Ferer et al.

[11] 4,366,006

[45] Dec. 28, 1982

[54] PROCESS FOR RECOVERING RESIN FROM A SPENT COMMERCIAL ARTICLE

[75] Inventors: Harvey D. Ferer; Luis F. Sierralta, both of Omaha, Nebr.

[73] Assignee: Aaron Ferer & Sons Co., Inc., Omaha, Nebr.

[21] Appl. No.: 246,990

[22] Filed: Mar. 24, 1981

[51] Int. Cl.$^3$ .............................................. B08B 7/00
[52] U.S. Cl. ...................................... 134/38; 521/40; 521/47
[58] Field of Search ............... 260/2.3; 134/10, 38; 252/170; 521/40, 47, 46.5

[56] References Cited

U.S. PATENT DOCUMENTS

| Re. 27,432 | 7/1972 | Torrenzano et al. | 134/12 |
|---|---|---|---|
| 2,288,588 | 6/1942 | Rieche et al. | 260/32 |
| 2,435,239 | 2/1948 | Schub | 134/6 |
| 2,541,380 | 2/1951 | Polly et al. | 252/362 |
| 2,610,166 | 9/1952 | Parry et al. | 260/33.4 |
| 2,749,313 | 6/1956 | Williams et al. | 252/104 |
| 2,850,461 | 9/1958 | Bloch et al. | 252/364 |
| 2,990,391 | 6/1961 | Grantham | 260/30.4 |
| 3,179,609 | 4/1965 | Morison | 260/28 |
| 3,189,553 | 6/1965 | Lange | 252/165 |
| 3,324,037 | 6/1967 | Rosenfeld | 252/120 |
| 3,354,093 | 11/1967 | Early et al. | 252/170 |
| 3,429,823 | 2/1969 | Cataneo | 252/170 |
| 3,475,218 | 10/1969 | Torrenzano et al. | 134/10 |
| 3,705,857 | 12/1972 | Clarke, Jr. et al. | 252/170 |
| 3,730,194 | 5/1973 | Shoner | 134/41 |
| 3,762,953 | 10/1973 | Clarke, Jr. et al. | 134/38 |
| 3,764,384 | 10/1973 | Berni | 134/10 |
| 3,836,486 | 9/1974 | Hafner | 260/2.3 |
| 3,975,208 | 8/1976 | Tate et al. | 134/38 |
| 4,104,341 | 8/1978 | Keppler et al. | 260/2.3 |

*Primary Examiner*—S. Leon Bashore, Jr.
*Assistant Examiner*—Michael Goldman
*Attorney, Agent, or Firm*—David A. Jackson

[57] ABSTRACT

A method for recovering a resin material from a spent commercial article comprises contacting the commercial article with a solution of a dialkyl ketone and tetrahydrofuran, and granulating the resin material, and recovering the resulting resin granules. The present method is useful for the recovery of synthetic resins including polyolefins, polycarbonates and vinyl polymers. The granulated resins recovered have a high purity in addition to retaining the properties and composition of the original resin material, and little or none of the solution utilized in the recovery process is lost. In the instance where the resin is being removed from a metal substrate, the surface of the substrate is undamaged and perfectly clean, and the recovery solution is free from metallic particles.

16 Claims, No Drawings

PROCESS FOR RECOVERING RESIN FROM A SPENT COMMERCIAL ARTICLE

BACKGROUND OF THE INVENTION

This invention relates to the recovery of resinous materials from articles of commerce, and more particularly to the recovery of thermoplastic resins.

In recent decades, the number and variety of commercial applications for resinous materials has increased beyond all estimates, and presently accounts for the manufacture of a majority of all commercial products. The heavy employment of such resinous materials has resulted in a constantly growing demand for the raw material. As many of the starting materials for the manufacture of these resins are derived from naturally occurring commodities such as petroleum, the recent increase in the cost of petroleum, coupled with its finite supply, looms as a serious problem that could manifest itself in the future in the form of curtailed supplies and concommitant price escalations.

A second more immediate problem which likewise portends to reach critical proportions is the disposal of commercial articles prepared in whole or in part from these resinous materials, which articles are no longer useful. For example, a variety of products ranging from package wrapping materials and ball point pen barrels, to insulative coatings on metal conductors, must be effectively and economically disposed of in a way which minimizes negative environmental impact. Most synthetic resinous wastes are disposed in the same manner as other waste materials, and are thus incinerated or otherwise destroyed, and the residue then is disposed of in land fills and the like. The incineration of these materials presents dangers to the air quality of the adjacent area, as the by-products of incineration comprise a variety of toxic vapors that must be effectively recovered before they escape into the atmosphere.

Also, as the use of these resins in commercial products increases, along with the general increase in refuse that must be disposed of, the problem of availability of disposal sites will become critical. When the difficulties of the disposal of these materials is considered with the eventuality that these materials may become less available and more expensive due to a reduction in the natural resources from which the starting materials of these resins are derived, the importance in value of recovering these materials from spent commercial applications becomes increasingly important.

The prior art is aware of several solvent compositions that have been utilized in the past for stripping certain resinous coatings from metal substrates. Specifically, U.S. Pat. Nos. 3,705,857 and 3,762,953 to Clarke, Jr. et al use a combination of a dialkyl ketone and a solvent selected from dimethyl formamide, tetrahydrofuran and mixtures which the patentee indicates operates in a fast-acting manner for the express purpose of stripping coatings primed with polyvinyl butyral. Clarke et al, like many similar disclosures in the art at that time, reported that the application of the stripping composition resulted in the swelling of the coating due to the infiltration of the stripping solution, and the subsequent delamination of the coating from the substrate. The method according to Clarke et al U.S. Pat. No. 3,762,953 preferably took place within fifteen to thirty minutes, however, the resin under attack appears to break down and enter solution, with the remainder of the resin retaining a gel-like consistency resulting from the infiltration of the solvent. There is therefore no appreciation in the Clarke et al patents or anywhere in the prior art that the resin coatings might be capable of recovery to a state useful for recycling into subsequent commercial applications.

Other patent references were considered, all of which deal generally with the area of solvent stripping. These patents are listed serially below:

| U.S. Pat. No. | Patentee | Date |
| --- | --- | --- |
| 3,730,194 | Shoner | 1973 |
| Re 27,432 | Torrenzano et al | 1972 |
| 3,475,218 | Torrenzano et al | 1969 |
| 3,429,823 | Cataneo | 1969 |
| 3,354,093 | Early et al | 1967 |
| 3,324,037 | Rosenfeld | 1967 |
| 3,321,407 | Rosenfeld | 1967 |
| 3,189,553 | Lange | 1965 |
| 3,179,609 | Morison | 1965 |
| 2,990,391 | Grantham | 1961 |
| 2,850,461 | Bloch et al | 1958 |
| 2,749,313 | Williams et al | 1956 |
| 2,610,166 | Parry et al | 1952 |
| 2,541,380 | Polly et al | 1951 |
| 2,435,239 | Schub | 1948 |
| 2,228,588 | Rieche et al | 1942 |

Copies of the foregoing patent references have been forwarded herewith.

All of the above patent references relate primarily to solvent compositions whose express purpose is to attack the resin material and to drive it at least partially into solution to enable it to be removed from a non-resinous substrate. None of the references seeks to recover the resin in a form suitable for recycling or reuse in subsequent commercial applications.

SUMMARY OF THE INVENTION

In accordance with the present invention, a method for recovering a resin from a spent commercial article is disclosed, which comprises preparing a solution consisting essentially of a dialkyl ketone and tetrahydrofuran, contacting the entire spent commercial article with the solution and converting the commercial article to form a plurality of granules of the resin. The granules are then separated from the solution, and any solution adsorbed on their surface is removed, after which the granules are dried. When dry, the granules thus recovered are found to retain their original chemical structure, and are sufficient purity to be used in the manufacture of new commercial articles.

More particularly, the solution prepared for use of the present method comprises a composition of a mixture of acetone and tetrahydrofuran, in which each of the ingredients may range in amount from 5 to 95% of the total composition. Preferably, the composition may contain a greater amount of acetone, as this ingredient is less volatile and less expensive.

The commercial article is preferably immersed in the solution and is maintained therein for a period of time of up to about three hours or more. The temperature of the solution need not exceed room temperature, and is preferably maintained thereat to minimize solution evaporation. Conversion of the article into the granular state occurs by subjecting the solution to mild infrequent agitation, and the resulting granules may then be separated from the solution by filtration. In a preferred embodiment, the filtered granules may be washed with acetone to remove any remaining amounts of solution that may have adsorbed on the granules. The granules may thereafter be washed with water to effect further solvent removal, after which the granules are dried preferably at room temperature to their final state.

The present method enables the resin in the commercial article to be fully recovered as originally constituted, with a purity sufficient to enable it to be employed in the manufacture of subsequent commercial articles without the need for reformulation or other further treatment. The method requires little energy input, and may be performed at room temperature. Further, solvent attrition is minimized, as the solvent in this method does not attack the polymer structure of the resin.

The present method is particularly useful in the removal of resinous insulation material from electrical conductor wire, as it fully recovers the resin while leaving the conductor wire with a perfectly clean surface. The recovery solution likewise does not contain metallic particles. By contrast, prior art methods for the removal of insulation from conductor wire, such as chopping, scored the wire surface and formed metallic particles that were difficult to recover, and contaminated the cleaning solutions for the metal.

Accordingly, it is a principal object of the present invention to provide a method for the recovery of thermoplastic resinous materials from commercial articles.

It is a further object of the present invention to provide a method as aforesaid by which the resin recovered is structurally unchanged from its original formulation, and is sufficiently pure to be directly employed in the manufacture of a commercial article.

It is a still further object of the present invention to provide a method as aforesaid, which requires negligible energy input, and is environmentally acceptable.

It is a still further object of the present invention to provide a method as aforesaid, that is inexpensive and simple.

Other objects and advantages will become apparent to those skilled in the art from a consideration of the ensuing specification.

DETAILED DESCRIPTION

In accordance with the present invention, the foregoing objects and advantages are readily attained.

The present method is directed to the recovery of certain resinous materials from spent commercial articles. The method of the invention comprises preparing a solution consisting essentially of a dialkyl ketone and tetrahydrofuran. The dialkyl ketone may include those ketones having the formula

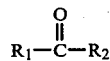

wherein $R_1$ and $R_2$ are, independently, alkyl radicals generally containing from 1 to 4 carbon atoms. Preferably, the dialkyl ketone utilized in the solution comprises acetone. The dialkyl ketone and tetrahydrofuran are mixed to form a composition which constitutes the solution utilized in the present invention. Both the compounds are well known chemicals that are readily commercially available, and can be used herein in their commercially available states.

The preparation of the solution of the present invention comprises mixing the dialkyl ketone and the tetrahydrofuran with each other. The mixing ratio of these compounds may range from 1% of the ketone and 99% of the furan, to the reverse. Preferably, the composition of the present solution contains a greater amount of the ketone, as it is less volatile and less expensive. Thus, ratios of ketone to furan of from 50:50 to 95:5 are preferred.

The components of the solution may be mixed or blended together manually, such as by use of a paddle stirrer, or by any conventional blending means such as magnetic stirrer or other mechanical agitator. The exact method of mixing is not critical.

After the solution is prepared, it is placed in contact with the commercial article containing or composed of the resin. Thus, the solution may be applied to the commercial article by a variety of means, such as spraying or dipping, and preferably by locating the solution in an appropriate holding tank, into which the commercial article may be immersed. This last procedure comprises the best mode of the present invention, as the resin containing article may remain immersed for an extended period of time, during which the resin may be converted to granular form.

In a preferred embodiment, the resin-containing commercial article is immersed in the solution and maintained therein for a period of time sufficient to convert all of the resin to the granular form. Thus, for example, the resin-containing commercial article may be held immersed in the solution for up to about two hours, and preferably from one to two hours, at which time granulation is completed. Naturally, the foregoing time periods are exemplary only, and may vary depending upon the size of the commercial articles in relation to the quantity of solution in which they are immersed.

It is noteworthy that the steps of contacting the commercial article with the solution, and granulating the resin thereafter, are conducted at room temperature, and, in any event, do not require the input of heat energy for their operation. The absence of a requirement for temperature elevation during the practice of the present method comprises one of its advantages, as the expense of energy input is eliminated, and the loss of solution due to volatization at elevated temperatures is likewise reduced. As a by-product, therefore, the cost of rejuvinating the solution is substantially reduced, and the toxic vapors resulting from volatization of the solution are likewise substantially eliminated.

The conversion of the resin into granular form occurs while the resin is immersed in the solution, and may be aided by mild intermittent agitation of the solution. The formation of resin granules having their original structural constitution is unexpected in view of the observations in the prior art that solutions similar in composition to that of the present invention have functioned to strip resin coatings by swelling the coating on contact, and infiltrating the resin structure to cause it to break down and go into solution with the solvent. Unexpectedly, the present solution consisting essentially of the acetone and tetrahydrofuran serves only to cause the granulation of the resin to occur, but otherwise does not deleteriously affect the resin structure. Thus, samples of pigmented resin from commercial articles granulated easily, and the resulting granules retained the physical and chemical characteristics of the original resin, including its pigmentation.

The present method is useful with a variety of resins, including natural and synthetic resins. Particularly, the present method is useful with polyolefins such as polyethylene and polypropylene, polycarbonates, and vinyl polymers such as polyvinyl chloride. The wide scope of activity of the present method is unexpected in view of the prior art, where it appeared that polyolefins were unaffected by a similar composition.

After the resin has been reduced to granular form, the granules are then separated from the solution. Separation may be conducted by filtration of the granules through appropriate means. Thus, in one embodiment, the solution may be held initially in a tank having at the bottom thereof a drain to a filter means. When granulation is completed, the drain could be opened, permitting the solution carrying the granular resin to exit through the drain, whereupon the resinous granules would be retained by the filter means, and thereby separated from the solution. In such instance, the solution could be directed to a fluid pump that would return the solution to the original tank. Naturally, the foregoing is illustrative only, as a variety of conventional techniques and apparatus known in the art, are suitable and may be used.

The size of the granules formed by the present invention may vary, but has generally been found to range on the order of about 0.05 to 0.10". Naturally, the nature of the filtering medium, and any filtering apparatus that may be used would vary depending upon the percentage of resin sought to be recovered. Thus, while the majority of the resin granules are clearly visible, and would fall within the aforenoted size ranges, a certain percentage of the resin will form finer sized granules, the recovery of which would necessitate the employment of a finer filter medium. Accordingly, a series of filter media could be disposed in a given line of flow of the solution, so that the finer particles would pass through the initial coarser filter medium, but would be entrained thereafter by the finer filter. The employment of this approach will depend upon the percentage distribution of fine granules that have been found to predominate. The invention therefore encompasses the employment of one or more filtrations, successively conducted as set forth above.

After the granules of resin are recovered, they may be further treated to remove any of the solution that remains adsorbed to the granule surfaces. Thus, the granules may be treated by washing one or more times, first with pure acetone, for the purpose of removing any solution that may remain. For example, the resin granules may be placed in an appropriate container, and the acetone may be poured therein and subsequently drained off. Alternatively, the granules may be placed within a container having one surface thereof constituted of a selectively permeable membrane, designed to retain the granules while allowing the acetone to flow through. In this way, the acetone may pass over the surface of the granules and carry with it any adsorbed tetrahydrofuran, as well as any remaining acetone. Generally, a single wash with acetone in the above manner is sufficient, however, the washing sequence may be repeated two or three times. The acetone washing sequence ends with the separation of the solution from the granules, usually performed by draining off the acetone solution.

After separation from the acetone washing solution, the resulting resin granules may be further washed with water to assure commercial purity and to carry away any of the remaining acetone wash. The exact quantity of water and the period of contact time may vary, as well as the manner of times that this washing sequence may be conducted. For example, the resin granules may be placed in a fluid permeable container through which water may be continually passed. Preferably, the water wash is conducted incrementally in repeated sequences, with the sequences corresponding in number to the pounds of granules being washed. Thus, for example, 25 lbs. of granules may be washed with water twenty-five times.

After the water wash is completed, the granules are dried. As with all of the steps of the present method, the drying of the granules does not require the input of heat energy, and may preferably take place at room temperature, to prevent undesired degradation of the resin or volatization of any of its components. The time required for complete drying may vary with the quantity of resin granules, but ranges generally up to about three to five hours. Naturally, the foregoing is an estimate and the invention should not be construed as limited thereto.

The present invention is useful for the recovery of the above resins from commercial products consisting wholly or in part thereof. Thus, items such as plastic containers, ball point pen barrels and the like may be recovered in granular form capable of reuse in commercial manufacturing of the self-same products. The present recovery process is particularly useful in the separation of resinous insulation from used electrical conductor conduit, wherein the conductive material comprises a metal such as copper or aluminum. In such instance, the conductor conduit, comprising cables, wires and the like is immersed in a vat of solution of the present invention, and the resin insulation is recovered in granular form as stated, while the underlying metal conductor is likewise recovered with its surface completely clear of all resin insulation. The present process eliminates the need for scraping or otherwise abrading the metal surface to assure the removal of all insulated material, while affording the opportunity to fully recover the resin material for recycling.

The present process is economical from the standpoint of maintenance, as the solution used herein is surprisingly subject to little loss by volatization or other attrition. For example, conductor cable weighing 760 lbs. before treatment was immersed in 25 gallons of the solution, and over the course of treatment from about 15% to 20% of the solvent was lost and in need of replenishing. This reduced amount of rejuvination is another feature of the present invention.

The present invention will become more readily apparant from the following illustrative examples.

EXAMPLE I

A series of tests was conducted on a laboratory scale to determine the operating parameters of the present method. Thus, five one-gallon containers were filled with solutions composed of a mixture of acetone and tetrahydrofuran. The ratio of acetone to tetrahydrofuran in all of the tanks was 50:50. Five separate lengths of conductor, each approximately 9" long, were individually immersed in the respective tanks. Four of the conductors possessed a copper core, while the fifth possessed an aluminum core, and all conductors utilized a polyvinyl chloride outer sheath.

Each of the conductor segments was maintained immersed in its respective solution, with intermittent mild agitation. After about 2½ to 3 hours time, the outer sheath of polyvinyl chloride separated from the core wire and formed a granular mass at the bottom of the container. The wire was removed and inspected, and was found to contain no trace of the outer sheath.

The granules were recovered from the solution by filtration through No. 2 Whatman filter paper disposed in a Buchner Funnel subjected to vacuum suction. The recovered granular filtrate was then washed once with ½ liter of reagent grade acetone, after which it was washed four times with aliquot portions of a total of 2 liters of tap water. The washed filtrate was then dried by exposure to room temperature air for about 3 hours. The dried granules were inspected, and it was found that all traces of solvent were absent, and the granules possessed the resiliency and color of their respective untreated insulator sheaths.

EXAMPLE II

Two tanks containing one gallon each of the solution were prepared, wherein the solution contained, respectively, 60% acetone and 40% tetrahydrofuran, and 80% acetone and 20% tetrahydrofuran. Identical lengths of the conductor materials treated in accordance with Example I, were immersed in the respective tanks, and the method was performed in identical accordance therewith. In both instances, the underlying metal conductor immerged with a completely clean surface. In the first tank, containing 60% acetone, the granulation occurred after 3¼ hours with the recovered granules ranging in size from 0.05 to 0.10″. The granules formed in the tank containing 80% acetone were recovered in four hours, and comparably sized granules were observed. It was therefore concluded that the presence of tetrahydrofuran in the solution contributes to the speed with which the granulation may be accomplished.

EXAMPLE III

A sample of insulated wire, with insulation of unknown composition was prepared for treatment in accordance with the present invention. In this example, the insulation was mechanically removed and weighed prior to immersion, and was found to weigh 453.6 grams.

The plastic insulation was then immersed in a solution of 95% acetone and 5% tetrahydrofuran disposed in a laboratory beaker, as with the previous experiments. After 4 hours, the insulation was observed to have fully granulated.

The solvent containing the granulated plastic was then filtered through a sheet of ordinary fabric resistant to the action of the solvent, to separate the particles of the plastic from the solvent solution. The resulting plastic particles recovered were then washed with 1,800 milliliters of hot water, after which a sequence of repeated washings, each washing with 1,800 milliliters of water was performed, so that a total of 25,200 milliliters of water was utilized in 14 separate sequential instances. Each of the water washes was retained and examined for signs of solvent. While visual examination disclosed no trace of solvent, the washes commencing with washes 12 and following carried no odor of the solvent solution, as had earlier washing samples.

The sample was permitted to stand in air for 23 hours after completion of the washing phase, at which time it was inspected and found to contain neither coloration or odor of the solvent solution. Measurement of the weight of the sample recovered revealed that it weighed 416 grams, suggesting a decrease of 37.6 grams after processing.

The solvent solution was similarly measured, and, prior to use weighed 735 grams, while after the process, the recovered solvent weighed 770.24 grams. In view of the relatively crude nature of this experiment and the equipment used therein, it is believed that the increase of over 35 grams in the weight of the solution is reflected by the retention in the solution of granular plastic having particle sizes that permitted passage through the filter medium.

EXAMPLES IV-XV

In the following examples a series of solutions were prepared and utilized in otherwise identical treatment processes to recover plastic insulation from conductor wire. The parameters of solution temperature and loss were measured as set forth in Table IV below. The composition of the solutions and the temperatures at which they were held during the treatment processes was varied to measure the effect, if any, that these parameters might have on the solution loss.

TABLE IV

| EX. # | RATIO ACETONE: THF | SOLUTION TEMP. (°F.) | STARTING AMOUNT (ml) | FINAL AMOUNT (ml) | SOLVENT LOSS (%) |
|---|---|---|---|---|---|
| 4 | 95:5 | 75° F. | 200 ml | 160 ml | 20% |
| 5 | 0:100 | 75° F. | 200 ml | 168 ml | 16% |
| 6 | 100:0 | 75° F. | 200 ml | 162 ml | 19% |
| 7 | 95:5 | 65° F. | 160 ml | 130 ml | 18.75% |
| 8 | 0:100 | 65° F. | 168 ml | 144 ml | 14.29% |
| 9 | 100:0 | 65° F. | 162 ml | 128 ml | 20.99% |
| 10 | 95:5 | 55° F. | 200 ml | 165 ml | 17.50% |
| 11 | 0:100 | 55° F. | 200 ml | 174.84 ml | 12.58% |
| 12 | 100:0 | 55° F. | 200 ml | 165.98 ml | 17.018% |
| 13 | 50:50 | 45° F. | 200 ml | 167.5 ml | 16.25% |
| 14 | 100:0 | 45° F. | 200 ml | 173.94 ml | 13.03% |
| 15 | 0:100 | 45° F. | 200 ml | 178.26 ml | 10.87% |

From a review of the results above, it appears that solution loss varies from 15 to 20% regardless of the exact portion proportion of the solvents in the composition, at room temperature or slightly below. Reducing the temperature to 45° F. had some advantageous effect on the loss of the individual components of the solvent solution but the loss of the mixed solution remained about the same.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for recovering an organic resinous material from a spent commercial article, comprising:
   A. preparing a solution consisting essentially of a dialkyl ketone and tetrahydrofuran;
   B. reducing said resinous material to a plurality of undissolved granules, by contacting said spent commercial article with said solution, wherein said resinous material and said granules remain at all times undissolved and do not swell because of solution infiltration;
   C. separating said granules from said solution, and thereafter removing from said granules any solution adsorbed thereon; and
   D. drying said granules;
   wherein Steps B–D are all performed at room temperature, and wherein said dried granules are identical in chemical composition, retain the chemical structure possessed by said resinous material in the original commercial article, and are of sufficient purity to be utilized in commercial manufacturing.

2. The method of claim 1 wherein said dialkyl ketone comprises acetone.

3. The method of claim 1 wherein said ketone and said tetrahydrofuran are present in a ratio of said ketone to said tetrahydrofuran of from 5:95 to 95:5.

4. The method of claim 3 wherein said ketone is present in an amount greater than that of said tetrahydrofuran.

5. The method of claim 1 wherein said contacting step comprises immersing said spent commercial article in a quantity of said solution.

6. The method of claim 1 wherein said spent commercial article is maintained in contact with said solution for a period of time sufficient to completely reduce said resinous material to said granules.

7. The method of claim 6 wherein said spent commercial article is immersed in said solution, and said solution is subjected to mild intermittent agitation.

8. The method of claim 6 wherein said spent commercial article is maintained in contact with said solution for a period of time of up to about three hours.

9. The method of claim 1 wherein said separating step comprises the filtration of said granules from said solution.

10. The method of claim 9 wherein said solution is subjected to more than one filtration.

11. The method of claim 9 wherein, after said filtration, said granules are washed with a quantity of acetone.

12. The method of claim 11 wherein said granules are maintained under agitation during said wash with acetone.

13. The method of claim 11 wherein after washing said granules with acetone, said granules are washed at least once with a quantity of water.

14. The method of claim 1 wherein said drying step comprises exposing said granules to atmospheric air.

15. The method of claim 1 wherein said resin is selected from the group consisting of polyolefins, polycarbonates, vinyl polymers and mixtures thereof.

16. A method for recovering a resin from a spent commercial article consisting essentially of:
  A. preparing a solution consisting essentially of acetone and tetrahydrofuran, the ratio of said acetone to said tetrahydrofuran ranging from 5:95 to 95:5;
  B. reducing the resinous material in said spent commercial article to a plurality of granules having particle sizes ranging up to about 0.10″ by immersing said spent commercial article in a quantity of said solution, and maintaining said article in said solution under mild intermittent agitation, wherein said resinous material and said granules remain at all times undissolved and do not swell because of solution infiltration;
  C. separating said granules from said solution by filtering said solution at least one time, and thereafter removing any adsorbed solution from said granules by
    a. performing a first wash of said granules with a quantity of acetone,
    b. separating said granules from said acetone wash,
    c. performing at least one wash of the granules separated in step b with water, and
    d. separating said granules after the wash of step c;
  drying said granules by exposing said granules to atmospheric air;
  wherein Steps B–D are all performed at room temperature, and
  wherein said dried granules are identical in chemical composition, retain the chemical structure possessed by said resinous material in the original commercial article, and are of sufficient purity to be utilized in commercial manufacturing.

* * * * *